Aug. 24, 1954  D. J. AUSTERMILLER  2,687,307
SEED BROADCASTING APPARATUS
Filed Jan. 22, 1953  3 Sheets-Sheet 1

INVENTOR
Donald J. Austermiller

BY Burns, Doane & Benedict
ATTORNEYS

INVENTOR.
Donald J. Austermiller
BY
Burns, Doane & Benedict
ATTORNEYS

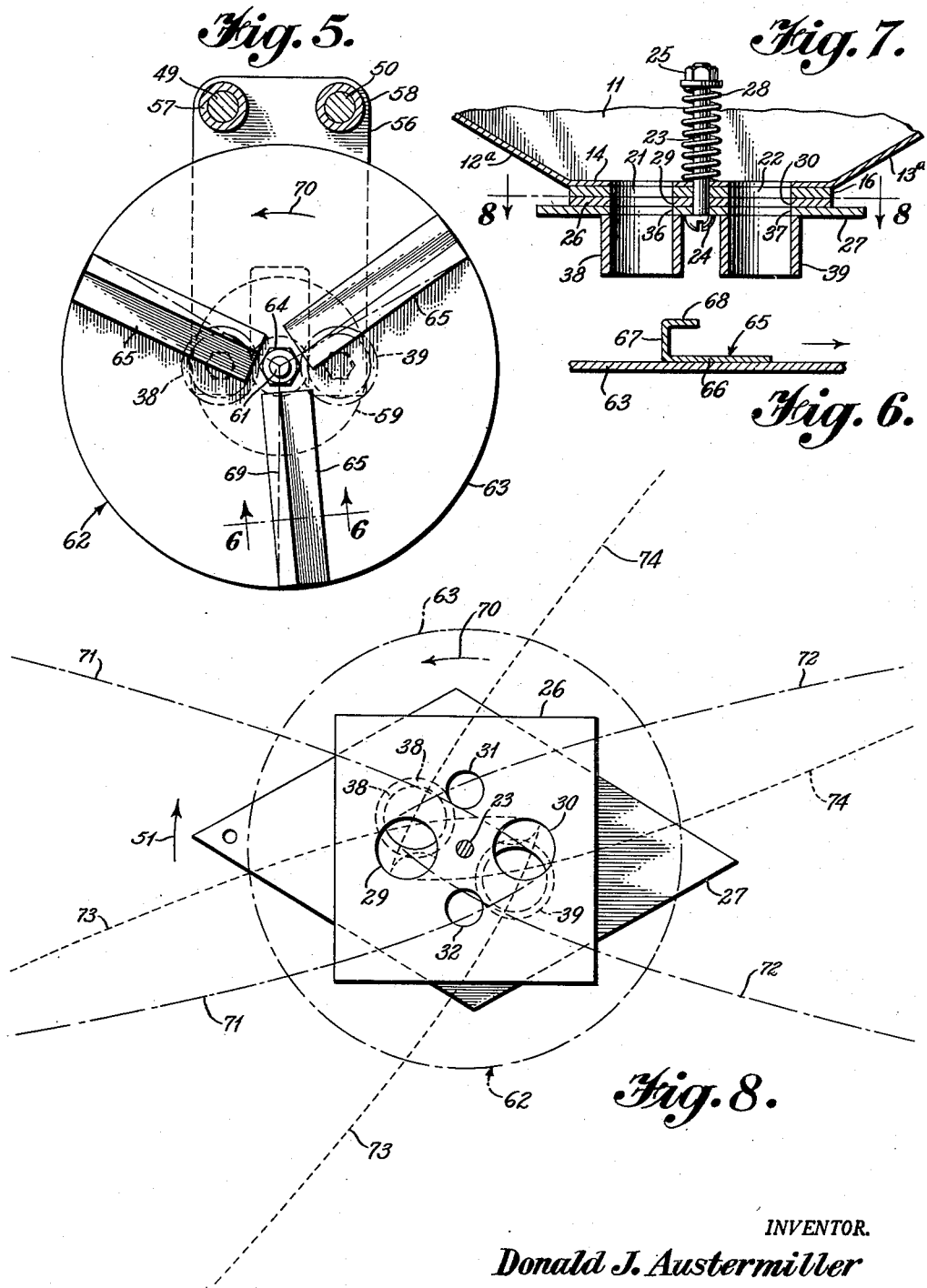

Patented Aug. 24, 1954

2,687,307

UNITED STATES PATENT OFFICE 2,687,307

SEED BROADCASTING APPARATUS

Donald J. Austermiller, Napoleon, Ohio

Application January 22, 1953, Serial No. 332,613

5 Claims. (Cl. 275—8)

The invention relates to apparatus for sowing seeds by the broadcasting method.

The apparatus consists essentially of a hopper having seed outlets at the bottom thereof for discharging seeds into the path of vanes carried by a rotating disc which scatter the seeds laterally so that they are more or less evenly distributed on the ground. Devices of this general type and for this purpose are not broadly new. My invention consists in certain improvements in such devices which enable improved results to be obtained.

Among the objects of my invention are to provide apparatus for this purpose having feed means for feeding seeds from a hopper to a distributing vane assembly which assures uniform feed at the desired rate with uniform distribution in the seeds in controlled patterns over the ground without drifting of the seeds in a breeze or light wind, which permits changes in the rate of feed of seeds without substantial changes in the feed patterns, which can be mounted on the front or rear of a tractor or other vehicle quickly without use of special tools, which provides for remote control of the seed feed cut-off, which can be stored easily in a manner to protect the moving elements from damage, which is provided with an independently controlled motor for driving the distributing vane assembly and which, therefore, enables the feed of the seeds to be independent of the speed of the vehicle on which the apparatus is carried, which provides both stepped and micrometer adjustments of the rate of feed of seeds, and which is of simple, compact and sturdy construction.

The foregoing and other objects and advantages of my invention may be understood by referring to the following detailed description having reference to the accompanying drawings, wherein:

Figure 5 is a horizontal sectional view taken in the direction of the arrows along the line 5—5 of Figure 2;

Figure 6 is a fragmentary sectional view taken in the direction of the arrows along the line 6—6 of Figure 5;

Figure 7 is a vertical sectional view taken in the direction of the arrows along the line 7—7 of Figure 3; and Figure 8 is a horizontal sectional view taken in the direction of the arrows along the line 8—8 of Figure 7.

Figure 1:
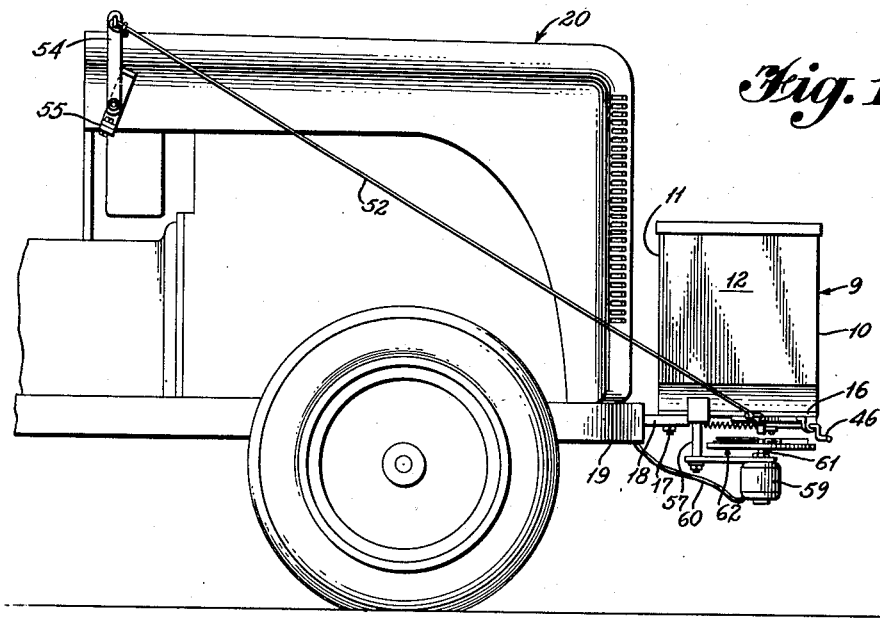
Figure 1 is a side elevational view showing the apparatus of the invention mounted on the front of a tractor.
Figure 2:
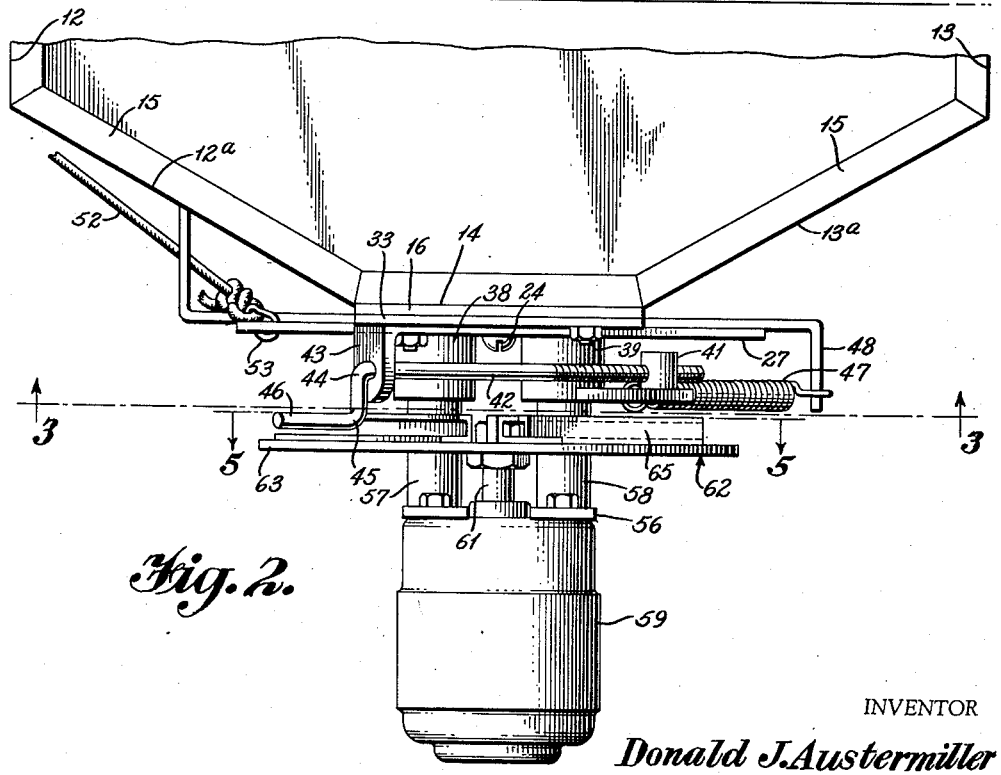
Figure 2 is a front elevational view of the lower portion of the apparatus.

The hopper is designated generally by the reference numeral 9 and consists of a front wall 10, a rear wall 11, side walls 12 and 13 which taper inwardly at 12a and 13a, and a flat bottom portion 14. The bottom portion 14 and the sides 12 and 13 are preferably provided with edge flanges 15 which may be welded or otherwise secured to the front and rear walls 10 and 11.

A reenforcing bar 16 extends the full length of the bottom portion 14. A bolt 17 extends through the bottom portion 14 and through the reenforcing bar 16 and is used to connect the apparatus to a front draw bar 18 on a tractor or other vehicle. The apparatus is shown attached in advance of the front bumper 19 of a tractor, designated generally by the reference numeral 20. As illustrated, the bottom of the hopper is positioned below the radiator portion of the tractor. This arrangement prevents seeds from lodging in the radiator. It will be apparent, however, that the apparatus may be mounted in other positions on a tractor or that it may be mounted on a truck, cultivator, or other agricultural implement.

A pair of horizontally and laterally spaced seed outlets 21 and 22 extend through the bottom portion 14 of the hopper and through the reenforcing bar 16. A vertical bolt 23, having a head 24 and a nut 25, extends through the bottom portion of the hopper and through the reenforcing bar 16 between and equally spaced from the seed outlets 21 and 22. An orifice plate 26 is pivotally mounted on the bolt 23 beneath the reenforcing bar 16. A metering plate 27 is also pivotally mounted on the bolt 23 beneath the orifice plate 26. A compression spring member 28 is positioned between the bottom portion 14 of the hopper and the nut 25, and this spring member serves to yieldably urge the orifice plate and the metering plate toward the lower surface of the reenforcing bar 16.

Figure 4:
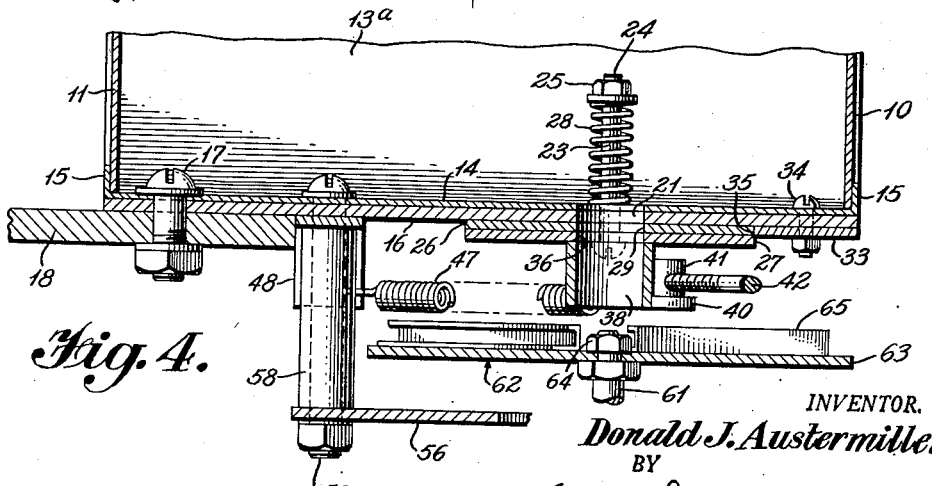
Figure 4 is a fragmentary vertical sectional view taken in the direction of the arrows along the line 4—4 of Figure 3.

The orifice plate 26 is provided with two pairs of orifices, either pair of which can be aligned with the seed outlets 21 and 22. The orifices 29 and 30 are preferably of the same diameter as the seed outlets 21 and 22. The orifices 31 and 32 are of substantially less diameter than the seed outlets. The orifice plate 26 is retained in position with a selected pair of orifices in alignment with the seed outlets by means of a shoulder member 33 which is secured to the lower surface of the reenforcing bar 16 by means of bolts 34. The shoulder member 33 provides a shoulder 35 which is positioned to engage an edge of the orifice plate 26. This arrangement is best shown in Figure 4 of the drawings in which the orifices 29 and 30 are shown in alignment with the seed outlets 21 and 22. The orifice plate may be moved to align the orifices 31 and 32 with the seed outlets by pulling the metering plate 27 and the orifice plate 26 downwardly against the action of the spring member 28. The edge of the orifice plate 26 will then clear the shoulder 35 to permit rotation of the orifice plate through ninety degrees, whereupon a different edge of the orifice plate will engage the shoulder 35.

The metering plate 27 is provided with a pair of apertures 36 and 37 which are preferably of the same diameter as the seed outlets 21 and 22 and which are equally spaced from the bolt 23 so as to be capable of alignment with the seed outlets. A pair of short spouts 38 and 39 extend downwardly from the apertures 36 and 37 and terminate slightly above the distributing vane assembly hereinafter described.

The metering plate is arranged to be pivoted on the bolt 23 to vary the extent of overlapping of the apertures 36 and 37 with those orifices of the orifice plate which are aligned with the seed outlets 21 and 22. The invention provides micrometer adjustment of the pivotal movement of the metering plate 27. An arm 40 is secured to the spout 39 and a nut 41 is rotatably mounted in the arm 40. A micrometer screw 42 is threaded into the nut 41. The opposite end of the micrometer screw 42 extends through an L-shaped bracket 43 which is secured to the hopper by means of one of the bolts 34. The micrometer screw 42 is bent at 44 to provide stop means engaging the bracket 43. The screw 42 is also bent at 45 to provide a crank handle 46. A tension spring member 47 has one of its ends connected to the arm 40 while its opposite end is connected to a bracket 48 secured to the reenforcing bar 16 by means of a pair of bolts 49 and 50. The spring member 47 tends to retain the metering plate 27 in the full line position shown in Figure 3, in which position the apertures 36 and 37 are in alignment with the seed outlets 21 and 22. It will be apparent that rotation of the micrometer screw 42 in a clockwise direction will cause the metering plate 27 to rotate or pivot slightly in the direction of the arrow 51, thereby reducing the extent of overlapping of the apertures 36 and 37 with the seed outlets 21 and 22. In this manner the rate of feed of seeds can be controlled in an infinitely variable manner.

Figure 3:
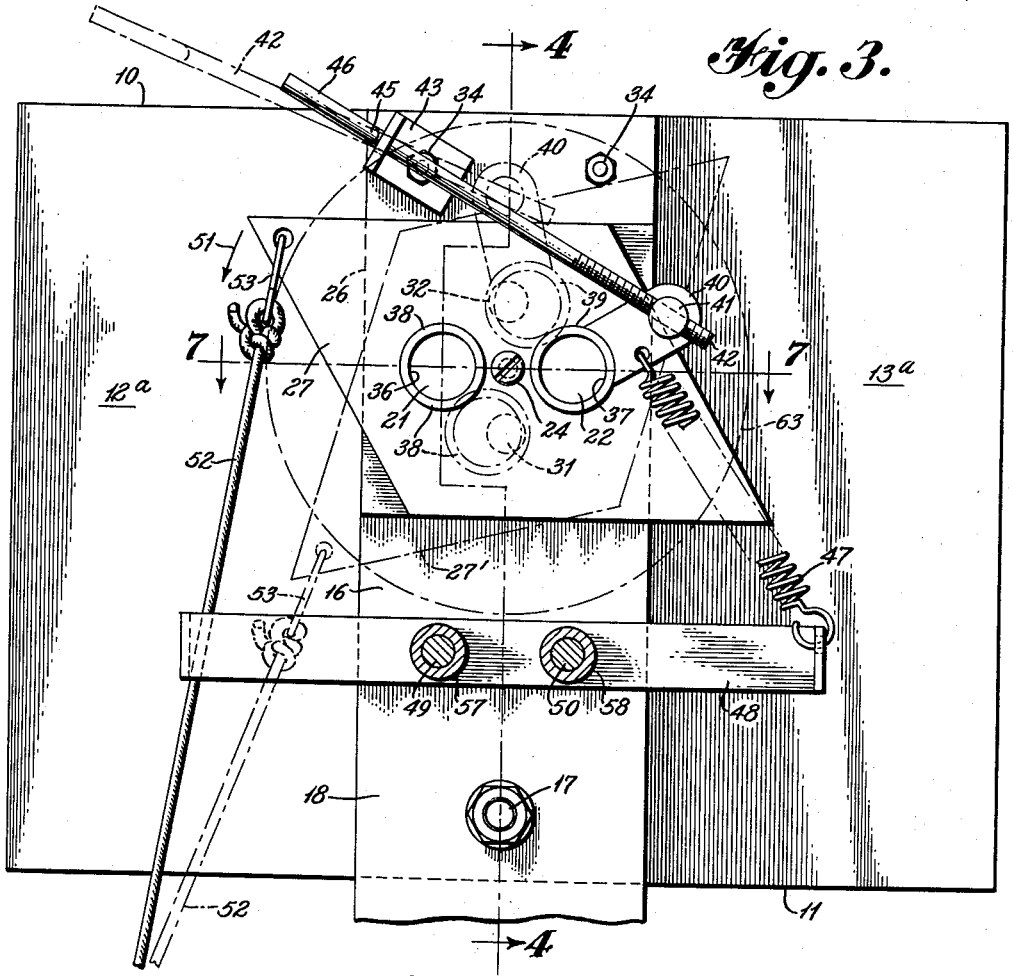
Figure 3 is a horizontal sectional view taken in the direction of the arrows along the line 3—3 of Figure 2.

The metering plate 27 can also be used to completely cut off the feed of seeds by further rotation of the metering plate in the direction of the arrow 51 to position 27' shown by dot-dash lines in Figure 3. The invention provides a flexible cord 52 for this purpose. The cord 52 is secured to the metering plate 27 by means of a clip 53. The opposite end of the cord 52 is secured to the upper end of a lever 54. When the lever 54 is in the position shown in Figure 1, the metering plate 27 will have been rotated in the direction of the arrow 51 to an extent to completely close the seed outlets 21 and 22. This position of the metering plate is shown in dot-dash lines in Figure 3. The lever 54 can be pivoted forwardly on its mounting bracket 55 to permit the spring member 47 to return the metering plate 27 to its position of adjustment as determined by the micrometer screw 42. It will be apparent that the micrometer screw 42 is capable of sliding movement through the bracket 43 during the opening and closing movement of the metering plate by means of the cord 52. The mounting bracket 55 can be mounted on the tractor or other implement in any position conveniently accessible to the operator.

A motor mounting plate 56 is mounted on the bolts 49 and 50 and is maintained in vertically spaced relationship to the reenforcing bar 16 by means of spacer sleeves 57 and 58. The motor mounting plate 56 is parallel to the bottom portion 14 of the hopper. A rotary motor 59 is mounted on the forward end of the mounting plate 56. The motor 59 is preferably an electric motor operable by current from the battery of the tractor to which the motor is connected by means of wires 60. The vertical shaft 61 of the motor has secured to its upper end a distributing vane assembly, which is best illustrated in Figures 5 and 6 of the drawings. This vane assembly is designated generally by the reference numeral 62. It consists of a flat disc 63 which is secured to the upper end of the motor shaft 61 by means of a nut 64. A plurality of generally outwardly extending vanes 65 are secured to the upper surface of the disc 63. The vanes have a disc engaging portion 66, a vertical seed throwing portion 67, and an upper lip portion 68. This arrangement is best shown in Figure 6. The vanes do not lie on truly radial lines on the disc 63. The dot-dash line 69 (Figure 5) connects the outer end of the seed engaging portion 67 of one of the vanes 65 with the axis of the motor shaft 61. It will be seen that the inner end of the seed engaging portion 67 of the vane lies somewhat behind this radial line, it being assumed that the disc rotates in the direction of the arrow 70. It has been found that this arrangement of the vanes is important to the securing of the seed distribution patterns hereinafter described.

Reference is now made to Figure 8 of the drawings. The motor 59 causes the disc 63 to rotate in the direction of the arrow 70. The orifice plate 26 is shown in a position to align the larger pair of apertures 29 and 30 with the seed outlets 21 and 22. The metering plate 27 is illustrated in a position in which the apertures 36 and 37 are in alignment with the seed outlets. Under these circumstances, the patterns of seed distribution will be approximately as shown by the dot-dash lines 71 and 72. These are the desired seed patterns in that the seeds are distributed laterally rather than onto the tractor or other implement. The adjustment of the rate of feed of seeds is accomplished by pivoting the metering plate 27 in the direction of the arrow 51 by means of the micrometer screw 42. This direction of pivotal movement of the metering plate 27, which is opposite to the direction of rotation of the disc 63, has been found to be of great importance in maintaining the desired seed patterns 71 and 72. When the metering plate is moved in the direction of the arrow 51, the points of deposit of the seeds on the distributing vane assembly 62 are moved in a direction opposite to the direction of rotation of the distributing vane assembly. In other words, the spouts 38 and 39 will be moved to the positions shown in the dotted lines in Figure 8. If the metering plate 27 were rotated in the opposite direction to reduce the rate of feed of seeds, the distribution pattern would be somewhat as shown by the dotted lines 73 and 74, which would be undesirable. It may be that the speed of the motor increases somewhat when the rate of feed of seeds is reduced and this is perhaps the explanation of the necessity for rotating the metering disc 27 in a direction opposite to the direction of rotation of the distributing vane assembly 62 when reducing the rate of feed.

There are other factors which are critical to the successful operation of the device. The speed of rotation of the distributing vane assembly 62 is critical, and I have found that speeds of 2,000 to 2,500 revolutions per minute as satisfactory. The dimentions of the vanes 65 are also critical. It is essential that the seeds be engaged by the seed engaging portions 67 of the vanes before the seeds fall onto the upper surface of the disc 63. The seed engaging portions 67 of the vanes 65 are preferably ¼ inch in height, and the lip portion 68 is preferably ¼ inch in length as viewed in transverse cross section. The lower ends of the spouts 38 and 39 are positioned not more than ¼ inch above the upper surface of the lips 68 of the vanes. I have secured satisfactory results by using a disc 63 having a diameter of 7½ inches, and with such a disc the inner end of the portion 67 of each vane 65 will lie approximately ¼ inch rearwardly of the line 69 (Figure 5).

The apparatus of the invention can be easily and quickly attached to a tractor or an agricultural implement by means of the single bolt 17. When an appropriate adjustment of the micrometer screw 42 has been made, the apparatus will distribute seeds at a uniform rate. The feed of seeds can be entirely cut off by pivoting the lever 54 rearwardly, as shown in Figure 1, which causes the metering plate 27 to move from the full line position, shown in Figure 3, to the dot-dash line position 27' shown in that figure. Forward movement of the lever 54 permits the spring member 47 to return the metering plate 27 to its original position of adjustment as determined by the micrometer screw 42. This remote control of the seed feed cut-off is advantageous to the operator. The device can be removed from a tractor or other implement and stored on a shelf in inverted position to prevent injury to the motor or other elements of the apparatus.

I have illustrated and described what I consider to be the preferred embodiment of the invention. It will be understood, however, that various modifications may be made without departing from the broader scope of the invention as described by the following claims.

Having thus described my invention, I claim:

1. A seed broadcasting device comprising a hopper having a flat horizontal bottom portion, a pair of horizontally spaced seed outlets in said bottom portion, a bolt extending vertically through said bottom portion between said seed outlets, a horizontal metering plate pivotally mounted on said bolt below said bottom portion, said metering plate having a pair of apertures therein positioned for alignment with said seed outlets and for disalignment therewith upon pivotal movement of said metering plate, a polygonal orifice plate rotatably mounted on said bolt between said bottom portion and said metering plate, a shoulder on the lower surface of said bottom portion in position to contact an edge of said polygonal orifice plate when said orifice plate engages said bottom portion, a compression spring member on said bolt urging said metering plate and said orifice plate toward said bottom portion, said spring member being yieldable for separation of said orifice plate from said bottom portion and said shoulder to permit rotation of said orifice plate about said bolt, and a plurality of pairs of orifices in said orifice plate, said pairs of orifices being positioned to cause a selected pair of orifices to align with said seed outlets when a selected edge of said metering plate contacts said shoulder.

2. A seed broadcasting device comprising a hopper having a flat horizontal bottom portion, a pair of horizontally spaced seed outlets in said bottom portion, a bolt extending vertically through said bottom portion between said seed outlets, a metering plate pivotally supported on said bolt below said bottom portion, an orifice plate pivotally mounted on said bolt between said bottom portion and said metering plate, said orifice plate having a plurality of pairs of orifices of different diameters therein, means for retaining said orifice plate in selected positions with a selected pair of said orifices in alignment with said seed outlets, apertures in said metering plate in alignment with said seed outlets, a rotary motor having a vertical shaft in alignment with said bolt, a distributing vane assembly fixed to said shaft below said metering plate, said vane assembly comprising a plurality of straight vanes extending horizontally from said shaft, the inner end of each vane being disposed rearwardly of a radial line from the outer end of the vane to said shaft and means for pivotally moving said metering plate in a direction opposite to the direction of rotation of said vane assembly to reduce the rate of feed of seeds to such vane assembly.

3. A seed broadcasting device comprising a hopper having a flat horizontal bottom portion, a pair of horizontally spaced seed outlets in said bottom portion, a bolt extending vertically through said bottom portion between said seed outlets, a metering plate pivotally supported on said bolt below said bottom portion, an orifice plate pivotally mounted on said bolt between said bottom portion and said metering plate, said orifice plate having a plurality of pairs of orifices therein, means for retaining said orifice plate in selected pivotal positions with a selected pair of said orifices in alignment with said seed outlets, apertures in said metering plate in alignment with said seed outlets, a rotary motor having a vertical shaft below and in alignment with said bolt, a distributing vane assembly fixed to said shaft below said metering plate, and means for pivoting said metering plate in a direction opposite to the direction of rotation of said vane assembly to reduce the extent of overlapping of said apertures and said orifices to thereby reduce the rate of seed feed to said vane assembly and to shift the points of deposit of such reduced seed feed onto said vane assembly in a direction opposite to the direction of rotation of such assembly.

4. A seed broadcasting device comprising a hopper having a flat horizontal bottom portion, a pair of horizontally spaced seed outlets in said bottom portion, a bolt extending vertically through said bottom portion between said seed outlets, a metering plate pivotally supported on said bolt below said bottom portion, an orifice plate pivotally mounted on said bolt between said bottom portion and said metering plate, said orifice plate having a plurality of pairs of orifices therein, means for retaining said orifice plate in selected positions with a selected pair of said orifices in alignment with said seed outlets, apertures in said metering plate in alignment with said seed outlets, a bracket on said hopper, a nut on said metering plate, a micrometer screw extending through said bracket, said micrometer screw threadedly engaging said nut and being provided with stop means engaging said bracket, whereby rotation of said screw effects adjustment of said metering plate to control the rate of feed of seeds.

5. Apparatus as defined by claim 4 in which said stop means on said screw is on the side of said bracket remote from said nut, a spring member urging said metering plate into position to cause said stop means to engage said bracket, and means for moving said metering plate against the action of said spring member to a position in which the metering plate completely closes said orifices to cut off the feed of seeds.

References Cited in the file of this patent

UNITED STATES PATENTS

| Number | Name | Date |
|---|---|---|
| 351,988 | Lord | Nov. 2, 1886 |
| 1,391,772 | Dunham | Sept. 27, 1921 |
| 1,668,657 | Reutter | May 8, 1928 |
| 2,334,376 | Bauer | Nov. 16, 1943 |
| 2,460,769 | Schwarz | Feb. 1, 1949 |
| 2,463,855 | Crawford | Mar. 8, 1949 |
| 2,513,215 | Strehlow | June 27, 1950 |
| 2,517,151 | Weston | Aug. 1, 1950 |
| 2,561,002 | Weeks | July 17, 1951 |
| 2,562,422 | Herd | July 31, 1951 |
| 2,632,651 | Rittenhouse | Mar. 24, 1953 |